United States Patent [19]

Blanc et al.

[11] Patent Number: 4,845,752
[45] Date of Patent: Jul. 4, 1989

[54] MULTI-SIGNAL PROCESSOR SYNCHRONIZED SYSTEM

[75] Inventors: Alain Blanc, Vence; Patrick Jeanniot, LaGaude; Sylvie Spalmacin-Roma, Nice, all of France

[73] Assignee: International Business Machines Corp., Armonk, N.Y.

[21] Appl. No.: 917,945

[22] Filed: Oct. 14, 1986

[30] Foreign Application Priority Data

Oct. 30, 1985 [EP] European Pat. Off. ......... 854300373

[51] Int. Cl.⁴ .............................................. G10L 3/00
[52] U.S. Cl. ..................................... 381/31; 364/131; 364/513.5; 379/286
[58] Field of Search .................................. 381/29–32, 381/41–45; 364/130, 131, 136, 140, 143, 513.5; 370/80, 83, 118; 375/25, 109, 114, 122; 379/284, 286, 290

[56] References Cited

U.S. PATENT DOCUMENTS

| | | | |
|---|---|---|---|
| 4,216,354 | 8/1980 | Esteban et al. | 381/31 |
| 4,445,213 | 4/1984 | Baugh et al. | 370/80 X |
| 4,475,011 | 10/1984 | Brightman et al. | 379/286 X |
| 4,567,606 | 1/1986 | Vensko et al. | 381/43 |
| 4,628,437 | 12/1986 | Poschmann et al. | 364/131 |

OTHER PUBLICATIONS

IBM TDB, "Voice and Data Transmission", vol. 25, No. 8, Jan. 1983, pp. 4474–4475.
ICASSP 81 Proceedings, "Multiport Implementation of a Real Time 16 Kbps Sub-Band Coder", vol. 2, 1981, pp. 459–462.

*Primary Examiner*—Patrick R. Salce
*Assistant Examiner*—Emanuel Todd Voeltz
*Attorney, Agent, or Firm*—John B. Frisone

[57] ABSTRACT

A multiprocessor system includes a plurality of signal processors and a common unit processor. Each of the signal processors is connected to a different source of signals such as voice signals and performs one or more signal processing functions relative to the connected source. The common unit processor performs one or more functions for the signal processors on a shared synchronized basis. A signal processor adapter responsive to a source of clock pulses generates synchronous interrupts applied to the common unit processor and enabling signals in sequence to connect the signal processor in sequence to the common unit processor in synchronization with the interrupts. In addition, the signal processors are provided with ping-pong buffers at their inputs and outputs to enhance throughput.

6 Claims, 4 Drawing Sheets

MULTI-SIGNAL PROCESSOR SYNCHRONIZED SYSTEM

A number of digital systems include specialized separate devices devoted respectively either to signal processing, or to system's management. Signal processors require a fairly large amount of computing power, while their memory requirements are not significant. For system's managing devices, the requirements are reversed.

TECHNICAL BACKGROUND

The above statements may be illustrated by way of an example, e.g. a digital voice and data transmission system. Assume a number of local voice terminals are to be attached to a digital transmission network. Each voice signal needs to be processed. It is first converted into digital form prior to being transmitted over the network. For that purpose the outgoing voice signal is submitted to more or less complex operations, designed to get the best voice coding quality, e.g. in terms of quantizing noise for a given bit rate. The processing workload required is fairly high, but it mainly consists in repetitive computing operations on the same data. For instance, the voice signal is processed by segments each 20 ms long. Each voice segment is sampled at, say, 8 KHz, and thus provides a block of 160 samples. Each sample is coded in PCM with 8 bits. Then each 20 ms, the whole block of PCM coded samples are reprocessed to lower the final number of bits required to code the same samples, while keeping the coding quality at the highest possible level.

A number of coders have been proposed to perform the above coding operations. One may refer for instance to European Pat. No. 0002998 (U.S. Pat. No. 4,216,354) to the same assignee for further details on these coders. But, with any of these coders, the rate of input/output operations is fairly limited (e.g. one operation per 20 ms) and requires little data transfers when compared with the processing workload required for compression and related signal processing operations.

A primary reason for doing the compression operations has to do with the high cost of transmission channels. Important savings can be made by compressing voice signal and concentrating (e.g. multiplexing) as many voices as possible on the same transmission channel. Consequently several voice coders can be attached to the same channel, through a Control Unit made to manage the interface operations between a set of Voice terminals (coders) and a common channel.

For the above cited coder example, for instance, the Control Unit would have to control the coders I/O operations, for transferring each 20 ms the bits derived from a voice segment processed by each of the signal processors attached to the same Control Unit.

These transfers could be made using different methods. Some of these methods would be fairly rigid, therefore not allow easy reconfiguration of the network in the field.

A system architecture is proposed here, which conveniently combines hard and soft devices enabling program parametering of the system to adjust to the specific system configuration required.

This architecture is not however limited to voice multiplexing operations.

It may be generically used in all machines where several processors execute Tasks which may be included in a fixed time frame.

The expression "signal processor" will thus be used in this application for this kind of processor, even if the executed task is not related to signal processing.

The above will be made apparent from the following description, made with reference to the attached figures.

DESCRIPTION OF A PREFERRED EMBODIMENT OF THE INVENTION

Figure 1:
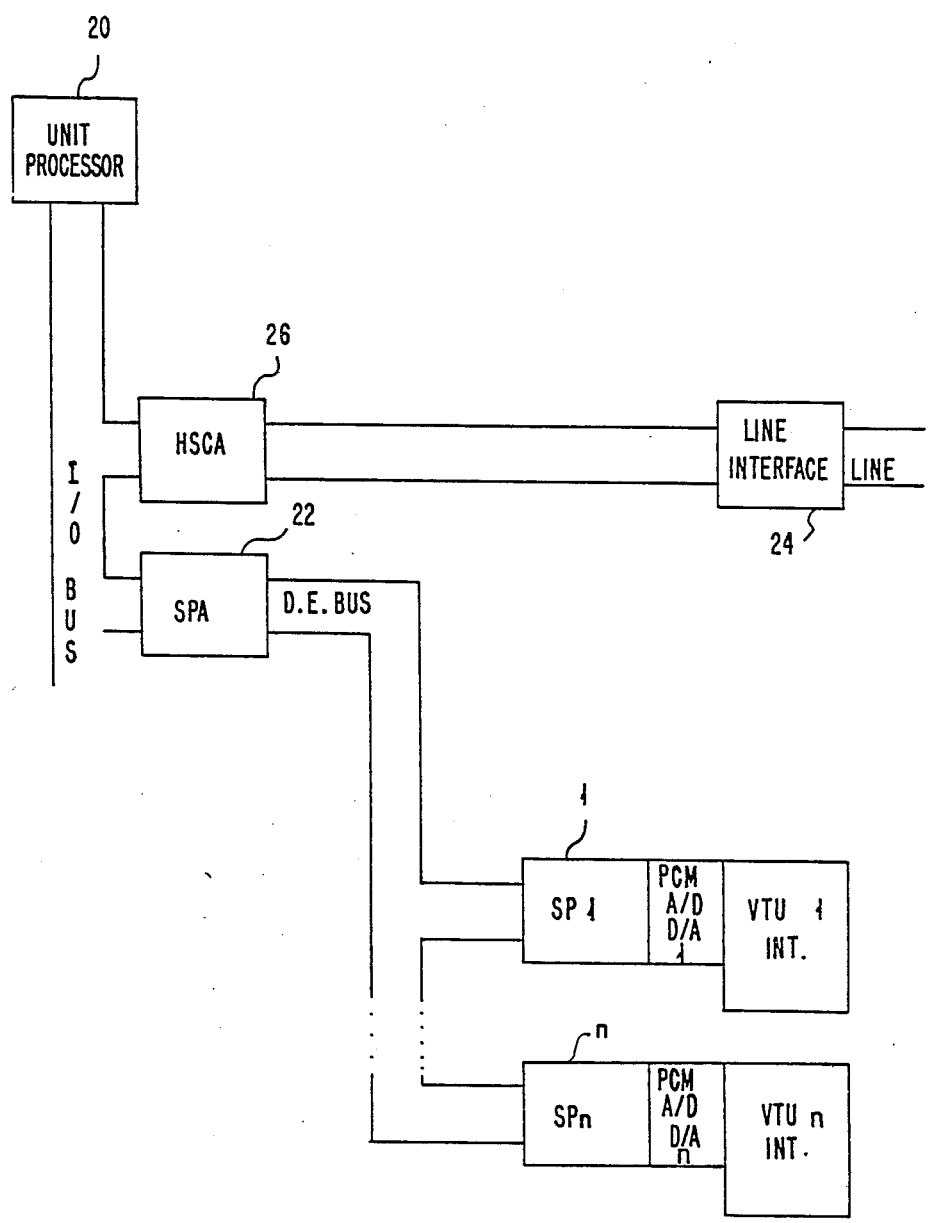
FIG. 1 is a block diagram of a system incorporating the invention.

FIG. 1 is a block diagram illustrating the basic architecture of a system made according to this invention. Each one of a set of n Voice Terminal Units is attached through an interface (VTU1 INT) through (VTUn INT) to a converter device (A/D, D/A) for performing analog-to-digital and digital-to-analog conversion respectively. In the A/D for instance, the voice signal, limited to the telephone frequency bandwidth 300–3400 Hz, is sampled at 8 KHz, and coded in PCM $\mu$law with 8 bits per sample. The voice signal is then considered by segments 20 ms long and each block of samples is recoded to improve the signal to noise ratio of the coded signal while keeping the bit rate required to a predetermined minimal level. This target may be reached by processing the PCM coded signal in a signal processor using BCPCM techniques combined with split band and dynamic allocation of coding resources, as disclosed in the above mentioned patent. According to the BCPCM technique, the 8-bit PCM coded samples are processed by blocks of samples wherefrom a characteristic term is derived (e.g. the largest sample) and then the samples of the block are requantized relative to the characteristic term. In addition, in the above mentioned patent, the voice signal is also split into several (p) subbands, which means that each original block provides p different blocks. The requantizing is performed within each subband with the requantizing number of bits being dynamically assigned to the subband.

At the end of this signal processing, each signal processor provides a block of bits resulting from the coding of a voice segment 20 ms long.

Every 20 ms, then, the transfer of a block of bits should be made from each operating signal processor (1 through n) to the Unit Processor 20 and vice versa. These transfers are made through a Signal Processor Adapter (SPA) 22.

The Unit Processor 20, is made to manage the transfer of voice originating bits, and/or service bits, such as telephone signaling, to and from a line interface through a High Speed Communication Adapter (HSCA) 26.

Figure 2:
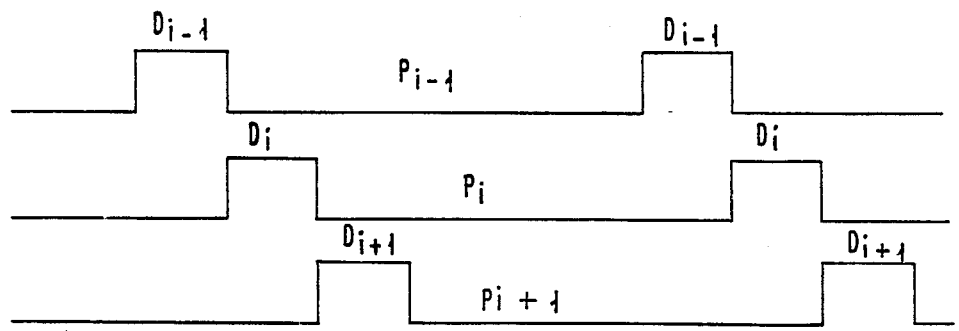
FIG. 2 represents a time diagram.

The data exchanges between the Unit Processor 20 and the n individual Signal Processors is made on a time sharing basis as schematically represented in FIG. 2.

The transfer between a given Signal Processor "i" and the Unit Processor, is made active during a time interval Di, and inactive during a time interval Pi. All the n Signal Processors should then be scanned within a time interval equal to the time involved in processing one block of samples within a Signal Processor, i.e. 20 ms.

The synchronization of the system is achieved by a logic system which gives a "Start process" and a "Data exchange" order to the Unit Processor and to the n different Signal Processors. The data exchanges are performed through a single data exchange bus (DE Bus) on which contention is avoided due to the above mentioned time distribution. Such a non-contention mode of operation, also enables simplifying both system hardware and software.

In summary, once one has defined the number of Voice Terminal Units, for instance "n", to be served by a given Unit Processor, and the voice segment time length T, then the time slot Dn is set equal to T/n. In fact, one may also choose to process the exchange of more than one voice segment at a time. For instance assuming two voice segments are packed together, then Dn=2T/n. And so on.

Also, should the number of Voice Units or their operating cycles require adjustment in the field, then, the operator could adjust the system to the required Dn.

Figure 3:
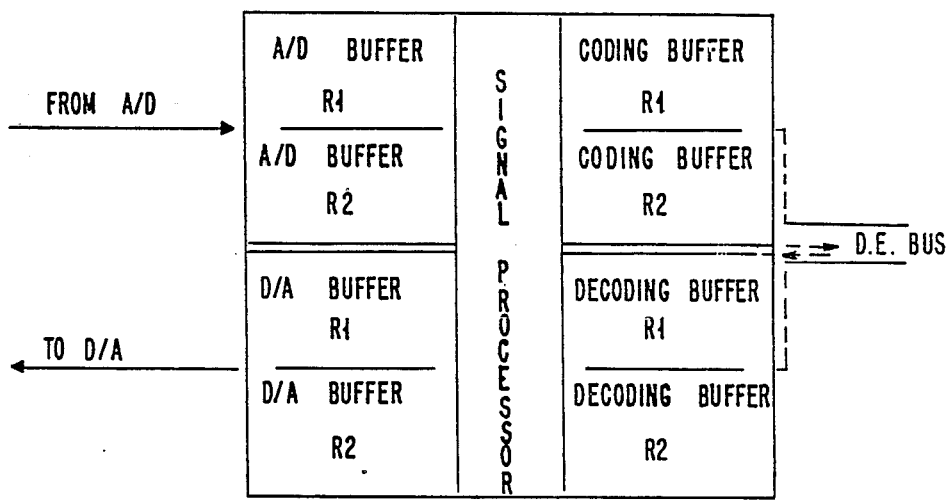
FIG. 3 is a block-diagram illustrating the invention.

In addition, to make the system operate even more smoothly, a so called "ping-pong" technique is implemented as schematically represented in FIG. 3. The data transfers from and to the signal processor are performed through double-buffering means (R1 and R2). Each pair of buffers is made to operate in a ping-pong mode, which means, alternately. For instance, assume at a given time slot Di, the A/D Buffer Register R1 is being loaded with PCM coded samples, during the same time slot, the PCM coded samples to be recoded using BCPCM and compression techniques as disclosed in the above mentioned patent, are fetched out of A/D Buffer Register R2 by the Signal processor.

The same operating process applies to the D/A Buffers and to the I/O means connected to the D.E. Bus, as well.

The system synchronization is achieved by the Signal Processor adapter (SPA) 22, normally and regularly requesting a Unit Processor interrupt every T/n second and also feeding clock signals to the signal processors SP1-SPn to start its operation.

Assuming the Voice signal is first to be sampled at 8 KHz and coded in PCM with 8 bits per sample, then every 125 microsecond on an interrupt mode, each signal processor SP1-SPn reads a byte (a sample) out of its corresponding A/D PCM converter and feeds it into one of its A/D buffers R1 or R2 alternately. At the same time, the Signal Processor reads a byte out of one of its D/A buffers R1 or R2 and feeds it into the D/A PCM converter.

The conversion from A/D PCM to compressed coding is performed over a block of say 160 PCM coded samples representing a segment of voice signal 20 ms long. The cycle is started by a special interrupt to the Signal Processor.

Obviously, when the transfer from/to A/D and D/A buffers affects the ping (R1) buffers, then the compression/decompression is performed over pong (R2) buffers.

In addition, assume n=8, and each voice segments is T=20 ms long, then T should be divided into n=8 slots each 20/8=2.5 ms long, thus Di=2.5 ms and Pi=17.5 ms.

Figure 4:
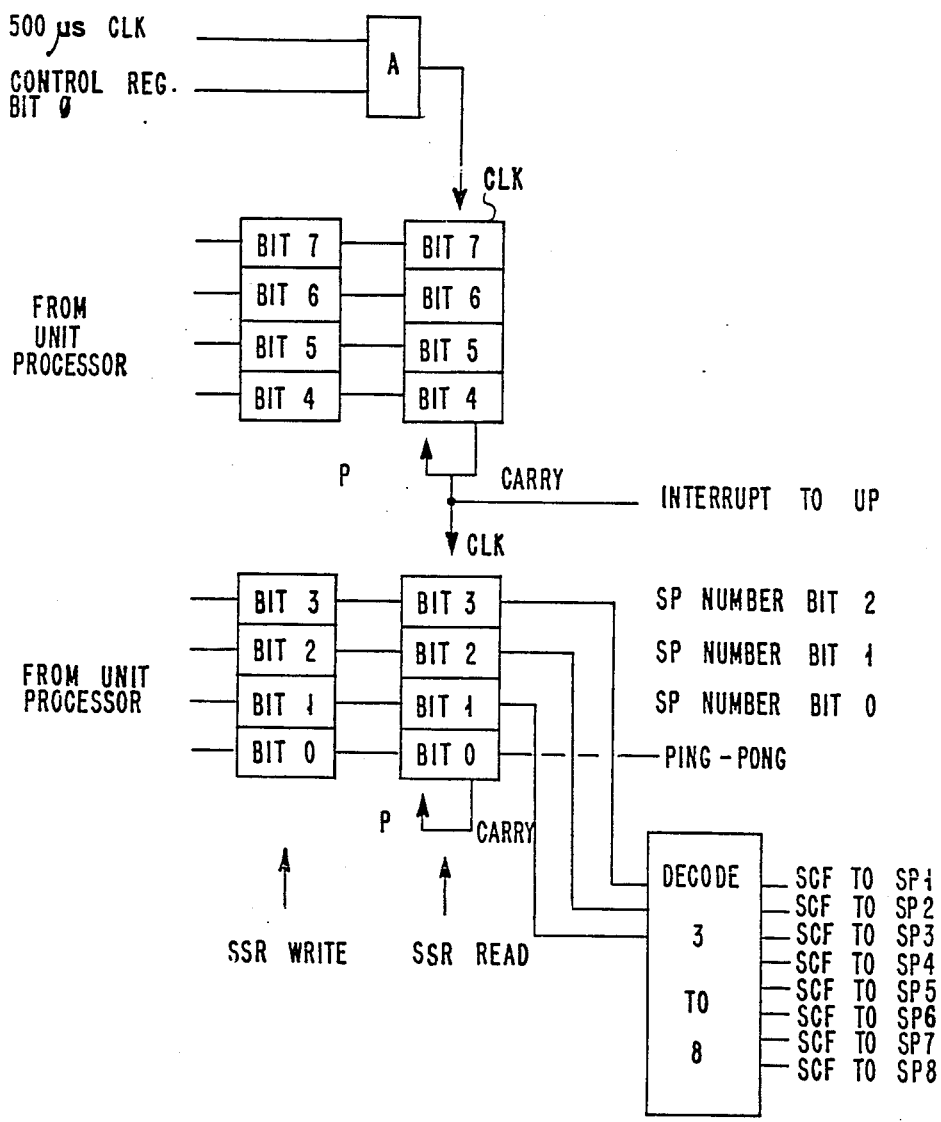
FIG. 4 is a circuit used in the invention.

The system synchronization is achieved by SPA22 through use of a SYSTEM SYNCHRONIZATION REGISTER (SSR). The System Synchronization Register of FIG. 4 is a 8-bit counter which may be preset by program to define the maximum count cycle. In practice said counter is doubled for buffering purposes (see SSR write and SSR Read).

The counter is divided into two parts. The four HIGH order bits will determine the ping-pong bit, which controls two consecutive signal processing cycles, and the start cycle flag, for each signal processor by raising the level of one out of eight outputs labeled SCF TO SP1 through SCF TO SP8 upon the decoding of the contents of bit positions 1-3 of SSR Read.

The four low order bit positions are initialized by the Unit Processor to fit with the number of PCM coded samples processed by the Signal Processor. The input clock for this counter has been made to be a 500 microseconds clock the cycle of which corresponds to four PCM coded samples.

If the counter is initialized by the Unit Processor to count "p" clock periods, then, the number of samples processed by each signal processor for analysis or compression and synthesis or decompression purposes will be:

$$N = 4 \times p \times 8 = 32\,p.$$

A flexibility of the system may be achieved through the selection of the "p" value.

The multiplication by four is made through hardware.

If the initial time of a total synchronization cycle is TO and if the SSR has been initialized to count p clock periods, the following table shows the details of the events occurring during the succeeding synchronization cycle.

|  | UC | SP1 | SP2 | SP3 | SP4 | SP5 | SP6 | SP7 | SP8 | P/P |
|---|---|---|---|---|---|---|---|---|---|---|
| TO | * | SCF | | | | | | | | 0 |
| TO + p × 500 μs | * | | SCF | | | | | | | 0 |
| TO + 2 × p × 500 μs | * | | | SCF | | | | | | 0 |
| TO + 3 × p × 500 μs | * | | | | SCF | | | | | 0 |
| TO + 4 × p × 500 μs | * | | | | | SCF | | | | 0 |
| TO + 5 × p × 500 μs | * | | | | | | SCF | | | 0 |
| TO + 6 × p × 500 μs | * | | | | | | | SCF | | 0 |
| TO + 7 × p × 500 μs | * | | | | | | | | SCF | 0 |
| TO + 8 × p × 500 μs | * | SCF | | | | | | | | 1 |
| TO + 9 × p × 500 μs | * | | SCF | | | | | | | 1 |
| TO + 10 × p × 500 μs | * | | | SCF | | | | | | 1 |
| TO + 11 × p × 500 μs | * | | | | SCF | | | | | 1 |
| TO + 12 × p × 500 μs | * | | | | | SCF | | | | 1 |
| TO + 13 × p × 500 μs | * | | | | | | SCF | | | 1 |
| TO + 14 × p × 500 μs | * | | | | | | | SCF | | 1 |

| | UC | SP1 | SP2 | SP3 | SP4 | SP5 | SP6 | SP7 | SP8 | P/P |
|---|---|---|---|---|---|---|---|---|---|---|
| -continued | | | | | | | | | | |
| TO + 15 × p × 500 μs | * | | | | | | | | SCF | 1 |

The asterisk indicate an interrupt requested to the Unit Processor 22 (UP) through the carry bit of upper part of SSR Read (see FIG. 4) section. The Start Cycle Flag (SCF) position indicates which signal processor starts a new signal processing cycle after transferring one block of samples to coding buffer and from decoding buffer R1 or R2 (depending upon the ping-pong P/P bit value).

In other words, the above table indications show the read/write data exchange from/to Unit Processor and from/to a Signal Processor.

Figure 5:
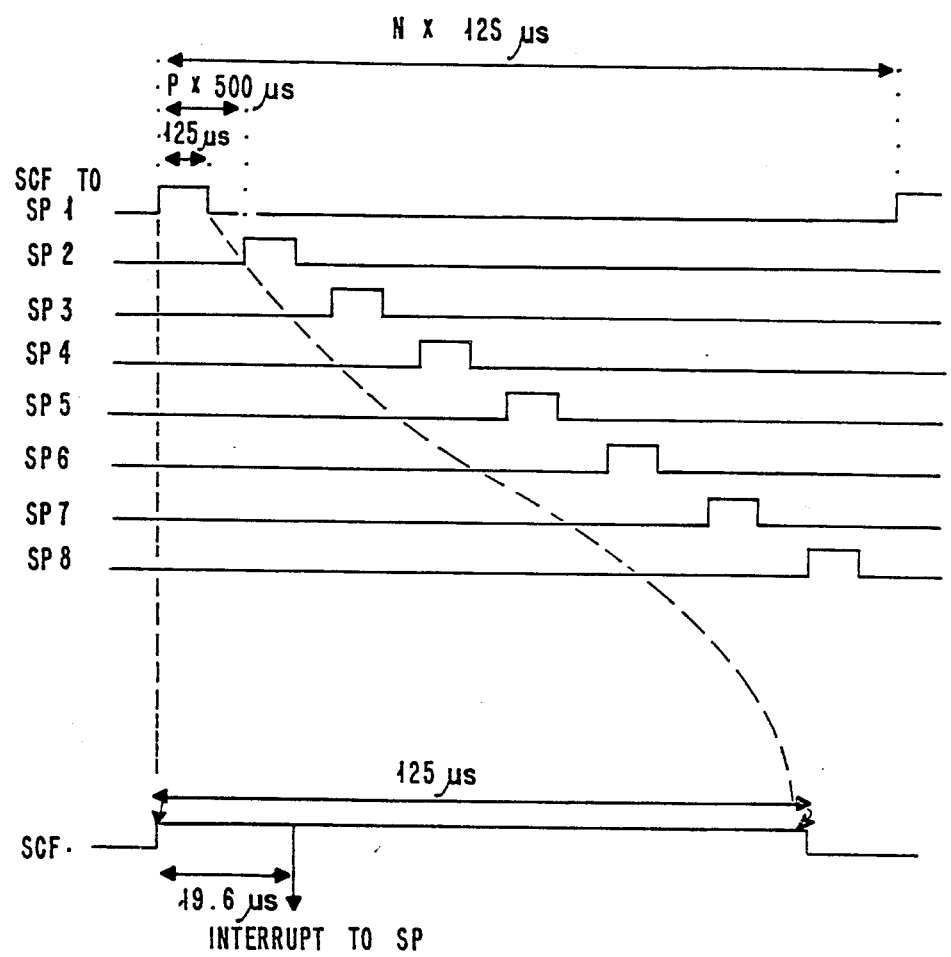
FIG. 5 is a timing diagram.

The interrupts are synchronized as indicated in FIG. 5. All the signal processors will receive regularly the normal 125 microseconds interrupt. Indications are given to each Signal Processor through the contents of a status byte location in their Input/Output memory space. This space is made to store a start cycle flag SCF and a ping-pong bit. In fact, the start cycle flag will be up for a signal processor, 395 microseconds after the raising of the related interrupt to up. The start cycle flag SCF will be up for each signal processor, only once every N×125 microseconds. This indication, together with the ping-pong bit value being at a one binary value, will start the initialization of a new signal processing cycle within the signal processor. The start cycle flag SCF timing chart is represented in FIG. 5, with an emphasized portion showing the relative phase of the 125 microseconds interrupt, with respect to the corresponding Start Cycle Flag. The SCF signal will automatically go down to zero level 105.4 microseconds after the interrupt request has been made to the corresponding signal processor SP.

In addition, the SSR counting can be inhibited by setting a CONTROL REGISTER bit φ to zero level and thus inhibit Unit Processor interrupts as well as start cycle flag generation.

We claim:
1. A multiprocessor system comprising:
   a plurality of signal processors each adapted to perform at least part of a signal processing operation for one of a plurality of different signal sources;
   a common unit processor for providing at least one function for each of said plurality of signal processors;
   a signal processor adapter connected to said common unit processor by an input/output bus and to said plurality of signal processors by a data exchange bus, said signal processor adapter providing a cyclic interrupt to said common unit processor via said input/output bus and scanning all of said signal processors via said data exchange bus in sequence and in synchronization with the interrupts to effect the transfer of signals between each signal processor and the common unit processor via said data exchange bus, said signal processor adapter and said input/output bus in the order of scanning sequences.

2. A multiprocessor system according to claim 1 in which said signal processor adapter comprises:
   a system synchronizing register operating as a counter under control of a source of clock pulses;
   first means for setting said register to a value which when set determines the count cycle for controlling the cyclic interrupt provided; and
   second means for examining the value of at least a part of the counter and generating signals for controlling the sequential scanning of the signal processors.

3. A multiprocessor system as set forth in claim 2 in which said system synchronization register comprises:
   a first half responsive to the source of clock pulses and generates a carry signal when it attains a predetermined value which is used as an interrupt signal to the common unit processor; and
   a second half responsive to the carry signal and connected to the said second means which generates signals for controlling the sequential scanning of the signal processors as a function of the attained value of the second half each time the common unit processor is interrupted.

4. A multiprocessor system according to claims 1, 2 or 3 further characterized in that each of said signal processors includes a dual buffering means for signal data transfers from and to said data exchange bus and operate on a ping-pong basis.

5. A multiprocessor system according to claim 4 further characterized in that the independent signal sources connected to the plurality of signal processors are voice signals and the processors are connected to the respective signal sources by a pair of dual buffers, each pair operating alternately on a ping-pong basis for input and output, respectively.

6. A system according to claim 5 further characterized in that the system synchronizing register provides a bit for controlling the ping-pong operation.

* * * * *